United States Patent
Yamano

(10) Patent No.: US 7,936,773 B2
(45) Date of Patent: May 3, 2011

(54) COMMUNICATION CHANNEL ESTABLISHMENT METHOD AND SYSTEM

(75) Inventor: Ryoko Yamano, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 118 days.

(21) Appl. No.: 12/206,309

(22) Filed: Sep. 8, 2008

(65) Prior Publication Data

US 2009/0232153 A1    Sep. 17, 2009

(30) Foreign Application Priority Data

Sep. 27, 2007    (JP) ................................. 2007-250861

(51) Int. Cl.
*H04L 12/28* (2006.01)
(52) U.S. Cl. .................. 370/431; 370/392; 370/328
(58) Field of Classification Search .......... 370/200–253, 370/351, 392, 431, 493, 328, 466, 400; 709/227, 709/223
See application file for complete search history.

(56) References Cited

U.S. PATENT DOCUMENTS

| 7,155,740 B2 * | 12/2006 | Brustoloni | 726/15 |
| 2003/0191843 A1 * | 10/2003 | Balissat et al. | 709/227 |
| 2007/0016663 A1 * | 1/2007 | Weis | 709/223 |

FOREIGN PATENT DOCUMENTS

JP    2005020215    1/2005

* cited by examiner

*Primary Examiner* — Ricky Ngo
*Assistant Examiner* — Iqbal Zaidi
(74) *Attorney, Agent, or Firm* — Studebaker & Brackett PC; Donald R. Studebaker

(57) ABSTRACT

The present invention provides a communication channel establishment method that establishes a communication channel used particularly when a cipher communication is carried out. Where a packet indicative of an ISAKMP message transmitted from a second communication device to a first communication device is awaited when a communication channel between the first and second communication devices is established via an IP network, the time taken to wait for the packet is counted by a corresponding packet waiting timer at random intervals. When a packet other than the sequence of each packet expected to be transmitted from the second communication device is received, the packet is accepted to establish the communication channel.

14 Claims, 6 Drawing Sheets

US 7,936,773 B2

COMMUNICATION CHANNEL ESTABLISHMENT METHOD AND SYSTEM

BACKGROUND OF THE INVENTION

The present invention relates to a method for establishing a communication channel through which a packet is encrypted and communicated, and to, for example, a method and a system for establishing a communication channel used in an IPsec (Security Architecture for Internet Protocol) communication, which encrypts an IP (Internet Protocol) packet used in the IPsec communication and communicates the same.

There has heretofore been known such an IKE (Internet Key Exchange) as shown in a non-patent document 1 (The Internet Key Exchange (IKE), Network Working Group, Request for Comments: 2409, Category: Standards Track, The Internet Society, November 1998) as a protocol for automatically performing the establishment of an SA (Security Association) used when a cipher communication is performed between communication devices in accordance with the IPsec, and the management of an IPsec communication. In the IPsec communication, a key exchange is carried out by the IKE. The SA is a connection of cipher communication for preventing each IP packet passing through a communication channel of each communication device from tapping and tampering.

As for a procedure based on the IKE, messages each called an ISAKMP (Internet Security Association And Key Management Protocol) packet are transferred or exchanged between the communication devices upon start of an encrypted communication to establish the SA. A cryptographic method or cryptography, an authentication method, an encryption key, authentication key and a validity period of the SA or the like are negotiated by the exchange of the ISAKMP packets and determined between the communication devices.

At a timing provided for the transmitting side of the communication device to send an IP packet to its opposite communication device, the IKE is started where the SA for the opposite communication device is unestablished. The communication device that transmits a first ISAKMP message at this IKE is called "initiator", and the communication device that transmits a second ISAKMP message with respect to the first ISAKMP message is called "responder".

The invention described in a patent document 1 (Japanese Unexamined Patent Publication No. 2005-020215) has described a conventional example wherein when trouble or failures occur during execution of an IPsec communication, a trouble notification packet is transmitted and a device having received the trouble notification packet therein establishes an IPsec communication newly.

When, however, both communication devices opposite to each other try to send IP packets with the same timing and both communication devices start the IKE with the same timing, there is a possibility that first ISAKMP messages at the IKE will mismatch on a communication channel.

When such trouble has occurred, the two communication devices are both operated as the initiators and are respectively placed in a state of waiting for second ISAKMP messages from their opposite communication devices. Thus, a problem arise in that since the first ISAKMP messages are discarded even though the first ISAKMP messages are received from the opposed communication devices in this state, the IKE does not succeed and no communication channel can be established.

After a time limit for waiting for the second ISAKMP messages has elapsed, both communication devices retransmit first ISAKMP messages. This retransmission process indicates that the corresponding ISAKMP messages are transmitted every retransmission interval preset to the communication devices respectively and by the number of retransmissions. The retransmission interval corresponds to a time limit for waiting for the reception of a second ISAKMP message from each of the opposed communication devices after the transmission of the first ISAKMP message. This is called "timer for waiting for the second ISAKMP message".

When the second ISAKMP message cannot be received from each of the opposite communication devices prior to the elapse of the waiting timer of the second ISAKMP message, the elapse of the waiting timer is triggered to send a first ISAKMP message to each of the opposite communication devices again. When the same values are set to both communication devices as the time interval of the waiting timer and the number of retransmissions respectively, the messages based on the IKE mismatch repeatedly, thus making it unable to cause the IKE to succeed and establish a communication channel. Processing at such a mismatch is not defined in RFC (Request For Comments), and the mismatch could not be prevented from occurring.

SUMMARY OF THE INVENTION

The present invention has been made in view of such problems. It is therefore an object of the present invention to provide a communication channel establishment method and system capable of establishing a communication channel, and particularly to provide a communication channel establishment method and system capable of establishing a communication channel when a cipher communication is carried out.

According to a first aspect of the invention, for attaining the above object, there is provided a communication channel establishment method for establishing a communication channel between a first communication device and a second communication device opposite thereto, comprising the steps of waiting for a packet transmitted from the second communication device to the first communication device, providing packet waiting timers each counting a time taken to wait for the packet, with a random interval left therebetween, receiving a packet other than the sequence of each packet expected to be transmitted from the second communication device, accepting the packet, and establishing the corresponding communication channel, based on the packet accepted in the accepting step.

In the waiting step in this case, even when a packet mismatch occurs between a first packet transmitted from the first communication device to the second communication device and a second packet transmitted from the second communication device to the first communication device, the first communication device preferably waits for the second packet. Preferably, the packet is of a packet for establishing the corresponding communication channel for performing a cipher communication.

According to a second aspect of the invention, for attaining the above object, there is provided a communication channel establishment method for establishing a communication channel between a first communication device and a second communication device opposite thereto, comprising the steps of waiting for a packet transmitted from the second communication device to the first communication device, receiving a packet other than the sequence of each packet expected to be transmitted from the second communication device, comparing the magnitudes of values different from one another set to the first communication device and the second communication device, accepting the packet, and establishing the corresponding communication channel, based on the packet accepted in the accepting step, wherein when the first communication device receives the packet other than the sequence of each packet expected to be transmitted from the second communication device in the receiving step, the accepting step determines based on the result of comparison whether the packet is accepted.

In this case, the accepting step preferably determines upon start of a packet exchange, during the packet exchange and after the completion of the packet exchange, whether the packet is accepted.

According to the present invention, even though a message other than expected to be transmitted is received from each of opposed communication devices where first and second communication devices are operated as initiators with the same timing and ISAKMP messages each corresponding to a first packet mismatch, the corresponding communication device is caused to have a state of answering such a message, thereby making it possible to transmit the message that each opposite communication device expects, allow an IKE to succeed and establish an SA regardless of a method of implementing coping with the case where the packet mismatch has occurred.

When the first and second communication devices are operated as initiators with the same timing and ISAKMP messages each corresponding to a first packet have mismatched therebetween, the magnitudes of values inherent in the devices like a MAC address and an IP address and the like are compared if the opposite communication devices are of devices which perform the same implementation as coping with the case where a mismatch has occurred, whereby a device brought to an initiator can be determined immediately after the occurrence of the mismatch, based on the result of comparison, thus making it possible to cause an IKE to succeed and establish an SA.

It is determined in advance whether an IKE with either of communication devices being set as an initiator should be made effective. It is possible to determine whether either of two SAs should be used after the completion of a bidirectional IKE.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described with reference to the accompanying drawings.

Figure 1:
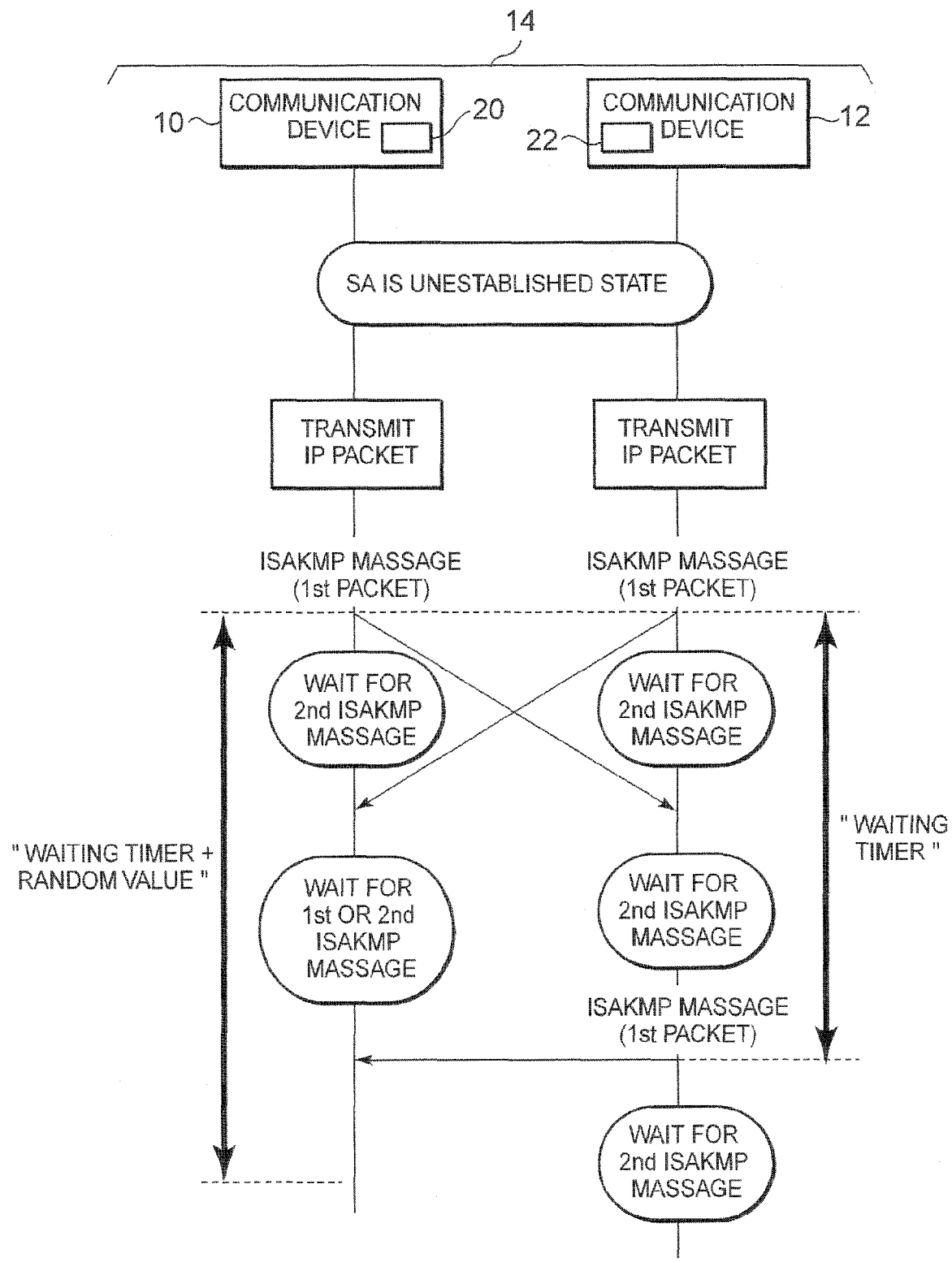
FIG. 1 is a diagram showing a configuration example of a communication system to which the present invention is applied.

A preferred embodiment of a communication channel establishment method according to the present invention will next be explained in detail with reference to the accompanying drawings. Referring to FIG. 1, a communication procedure employed in a communication system 14, which establishes a communication channel when a cipher communication is started between two communication devices 10 and 12, is shown therein. The communication devices 10 and 12 employed in the present embodiment form a communication channel for cipher communication when an IPsec (Security Architecture for Internet Protocol) communication is carried out via an IP network. Incidentally, the IP network may be wired and/or non-wired.

The communication device 10 has the function of transmitting an ISAKMP (Internet Security Association And Key Management Protocol) packet to its opposite communication device 12 when a cipher communication is started. Transmitting and receiving the packet therebetween creates or generates an SA (Security Association) for IKE (Internet Key Exchange), i.e., an IKE SA. The IKE is of a procedure for determining a cryptographic method or cryptography, an authentication method, an encryption key and an authentication key or the like used in the cipher communication using SA.

The communication devices 10 and 12 respectively generate keys for transmission/reception on the generated IKE SA and exchange the generated keys therebetween. When the exchange of the keys is performed and the IKE is successively made, the SA between the communication devices 10 and 12 is established. The communication devices 10 and 12 start the IPsec communication in accordance with the SA established by this IKE. At this time, one of the communication devices 10 and 12 generates a transmission SA for IPsec and the other thereof generates a reception SA for IPsec, whereby a packet communication based on the IPsec is executed.

In the present embodiment, the following functions are provided on the communication device 10 side. Incidentally, functions similar to those are provided even on the opposite communication device 12 side.

The communication device 10 has a waiting timer 20 which sets the time taken until a second ISAKMP message is transmitted following the transmission of a first ISAKMP message and counts the time. Incidentally, the communication device 12 is also equipped with a similar waiting timer 22.

The communication device 10 performs either a process for adding a random value to the counted time value of the second ISAKMP message by its waiting timer or a process for its subtraction to change the time length of the waiting timer, i.e., its set-up time. As the random value, a value generated by a random number generation function or the like is adopted with a value that cannot be the same value as a value set to the waiting timer of the opposite communication device 12, like a MAC (Media Access Control) address of the communication device 10 itself, an IP address thereof or the like being defined as a species of random number generation. Such addition/subtraction of the random value may not be performed on the waiting timer 22 of the communication device 12.

The communication device 10 has the function of, where it has received the first ISAKMP message from the communication device 12 when it further transmits the first ISAKMP message and is placed in a state of waiting for the second ISAKMP message from the opposite communication device 12 as an initiator, determining that a mismatch has occurred therebetween. The communication device 10 has a state control or management function for, when it has recognized the occurrence of the mismatch, changing the state of the communication device 10 itself as being placed in a state of waiting for the first ISAKMP message or the second ISAKMP message.

The communication device 10 has a standby function for going into a standby state for awaiting the next operation of the opposite communication device 12 in a state of being able to receive both the first and second ISAKMP messages. In this standby state, the communication device 10 continues counting without stopping the time-counting operation of the waiting timer 20 thereof.

Operations of a communication system according to the present embodiment will be explained under the so-described configuration. Where the communication device 10 receives a first ISAKMP message from the opposite communication device 12 when the communication device 10 transmits a first ISAKMP message and is placed in a state of waiting for a second ISAKMP message as the initiator, and thereby where the communication device 10 is brought into a state of waiting for the first ISAKMP message or the second ISAKMP message, the following first through third operations are carried out by a timeout by the timer 20, of a message transmitted from the communication device 12 or the second ISAKMP message set by the communication device 10.

Figure 2:
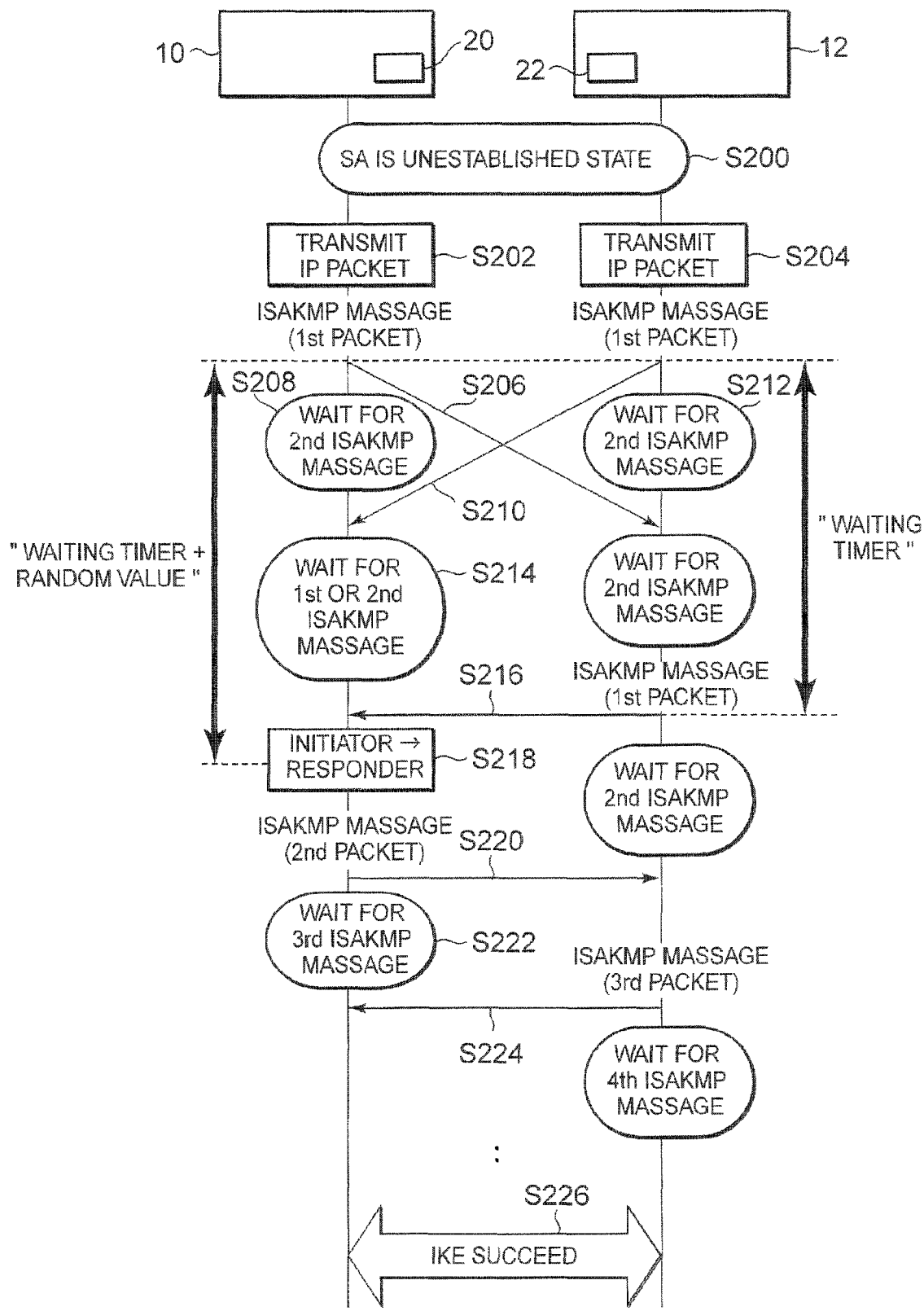
FIG. 2 is a diagram illustrating a first operation example of communication devices.

As for the first operation, the operation of transmitting an IP packet from the communication device 10 to the communication device 12 is started from a state in which the SA between the communication devices 10 and 12 is unestablished as indicated at Step S200 of FIG. 2 (Step S202). The operation of transmitting an IP packet from the communication device 12 to the communication device 10 is started contrary to this (Step S204).

An ISAKMP message corresponding to a first packet destined for the communication device 12 is transmitted from the communication device 10 at Step S206. Thereafter, the communication device 10 is brought into a state of waiting for a second ISAKMP message (Step S208). When the transmission of the ISAKMP message is completed, the communication device 10 starts to count the time of the second ISAKMP message by the waiting timer 20. Either addition or subtraction of a random value has been performed on the waiting timer 20.

An ISAKMP message corresponding to a first packet destined for the communication device 10 is transmitted from the communication device 12 at Step S210. Thereafter, the communication device 12 is placed in a state of waiting for a second ISAKMP message (Step S212). When the transmission of the ISAKMP message is completed, the communication device 12 starts to count the time of the second ISAKMP message by the waiting timer 22.

The communication device 10 changes the state of waiting for the second ISAKMP message to assume a state of waiting for the first or second ISAKMP message (Step S214). When the communication device 10 has received the first ISAKMP message from the opposite communication device 12 upon this state (Step S216), the communication device 10 is changed or switched from the initiator to a responder (Step S218). Thus, the communication device 10 transmits a second ISAKMP message corresponding to a second packet to the communication device 12 (Step S220) and makes a transition to a state of waiting for a third ISAKMP message (Step S222). Next, the first operation proceeds to Step S224, where the ISAKMP message corresponding to the third packet is transmitted from the opposite communication device 12 and received by the communication device 10. As a result, the IKE between the communication devices 10 and 12 succeeds and the SA is established between the communication device 12 corresponding to the initiator and the communication device 10 brought to the responder (Step S226), after which an IPsec communication is done.

Thus, even when such a configuration that the random value is added to and subtracted from the waiting timer 22 is not mounted onto the communication device 12 opposite to the communication device 10 and the first ISAKMP message is retransmitted to the communication device 10 as in the case of Step S216, the communication device 10 itself is switched to be operated as the responder, thereby making it possible to allow the IKE to succeed.

The second operation will next be explained with reference to FIG. 3. The second operation corresponds to the operation at which when the communication device 10 is in a state of waiting for a first ISAKMP message or a second ISAKMP message, the communication device 10 receives the second ISAKMP message from the opposite communication device 12.

Since the second operation may be based on operations similar to those of Steps S200 through Step S214 shown in FIG. 2, the second operation is shown using the same reference numerals. When the second operation proceeds to Step S300 following Step S212 corresponding to the operation of the communication device 12 opposite to the communication device 10 as shown in FIG. 3, the communication device 10 opposite to the communication device 12 is given series consideration or priority and the communication device 12 itself is changed from an initiator to a responder by switching. Thereafter, the communication device 12 transmits an ISAKMP message corresponding to a second packet to the communication device 10 (Step S302) and makes a transition to a state of waiting for a third ISAKMP message (Step S304). Next, the second operation proceeds to Step S306, where an ISAKMP message corresponding to a third packet is transmitted from the communication device 10 and received by the communication device 12. Then, the communication device 10 sends the third ISAKMP message while remaining in a state of being operated as the initiator and makes a transition to a state of waiting for a fourth ISAKMP message (Step S308).

As a result, the IKE succeeds between the communication devices 10 and 12, and the SA is established between the communication device 10 corresponding to the initiator and the communication device 12 corresponding to the responder (Step S308). Thereafter, an IPsec communication is carried out.

Thus, when the communication device 12 receives the first ISAKMP message from the opposite communication device 10 in a state of waiting for a second ISAKMP message, the communication device 10 opposite to the communication device 12 is given priority. When the communication device 12 is brought to the responder to perform such implementation as to transmit the second ISAKMP message, the communication device 10 is operated in sync with the operation of the communication device 12 corresponding to the responder, thereby making it possible to cause the IKE to succeed.

The third operation will next be explained with reference to FIG. 4. The third operation corresponds to the case in which as in the case where, for example, a random value is subtracted from the value of the waiting timer 20 and the result of its calculation is set to the corresponding waiting timer, a second ISAKMP message is set to a time interval at which the set value of the waiting timer 20 on the communication device 10 side is shorter than the set value of the waiting timer 22 on the communication device 12 side. When the time counted by the waiting timer 20 has passed over the set time and its time counting is completed, a timeout is reached. The waiting timer 20 repeats its time counting again upon this timeout.

Figure 3:
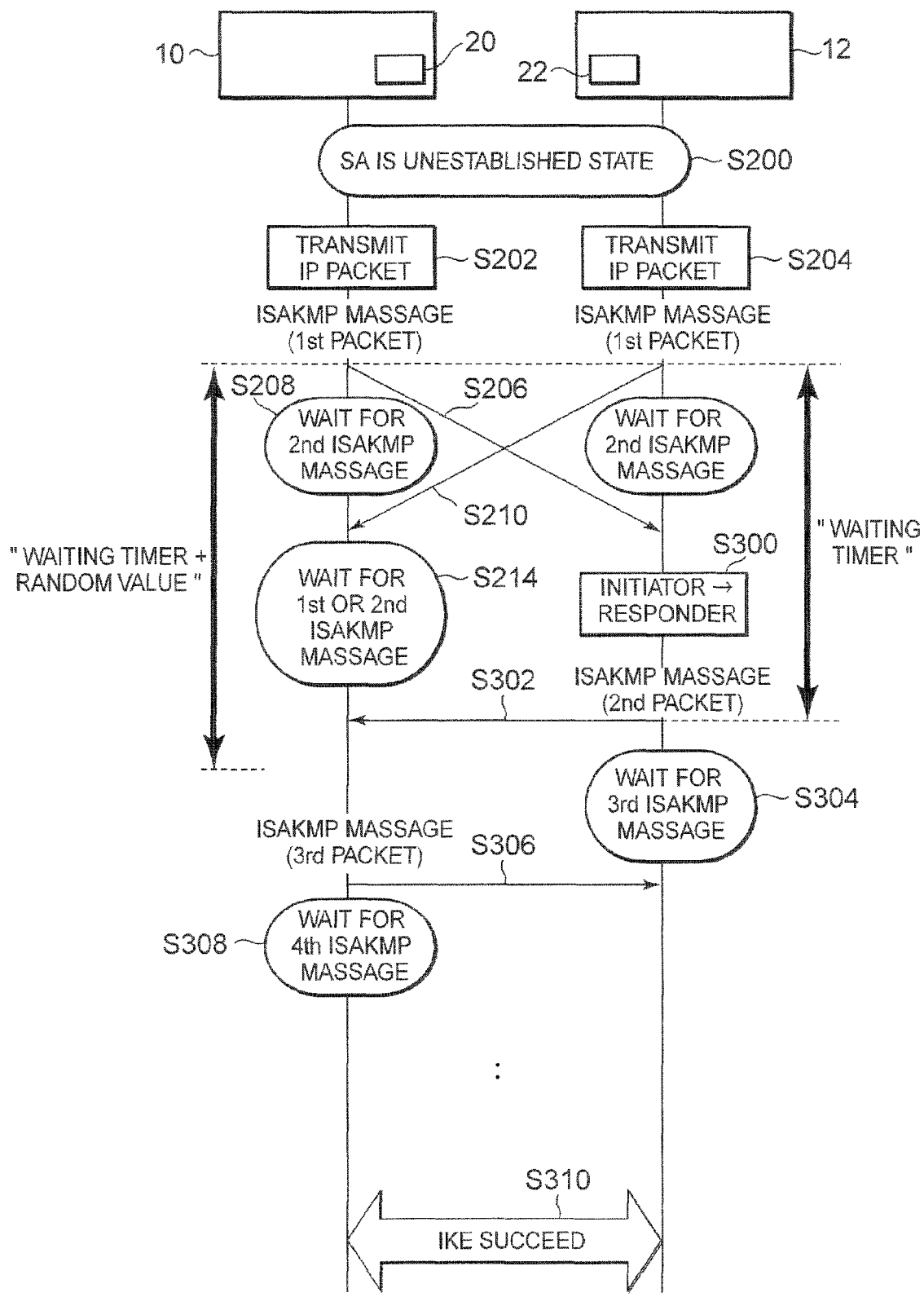
FIG. 3 is a diagram depicting a second operation example of the communication devices.
Figure 4:
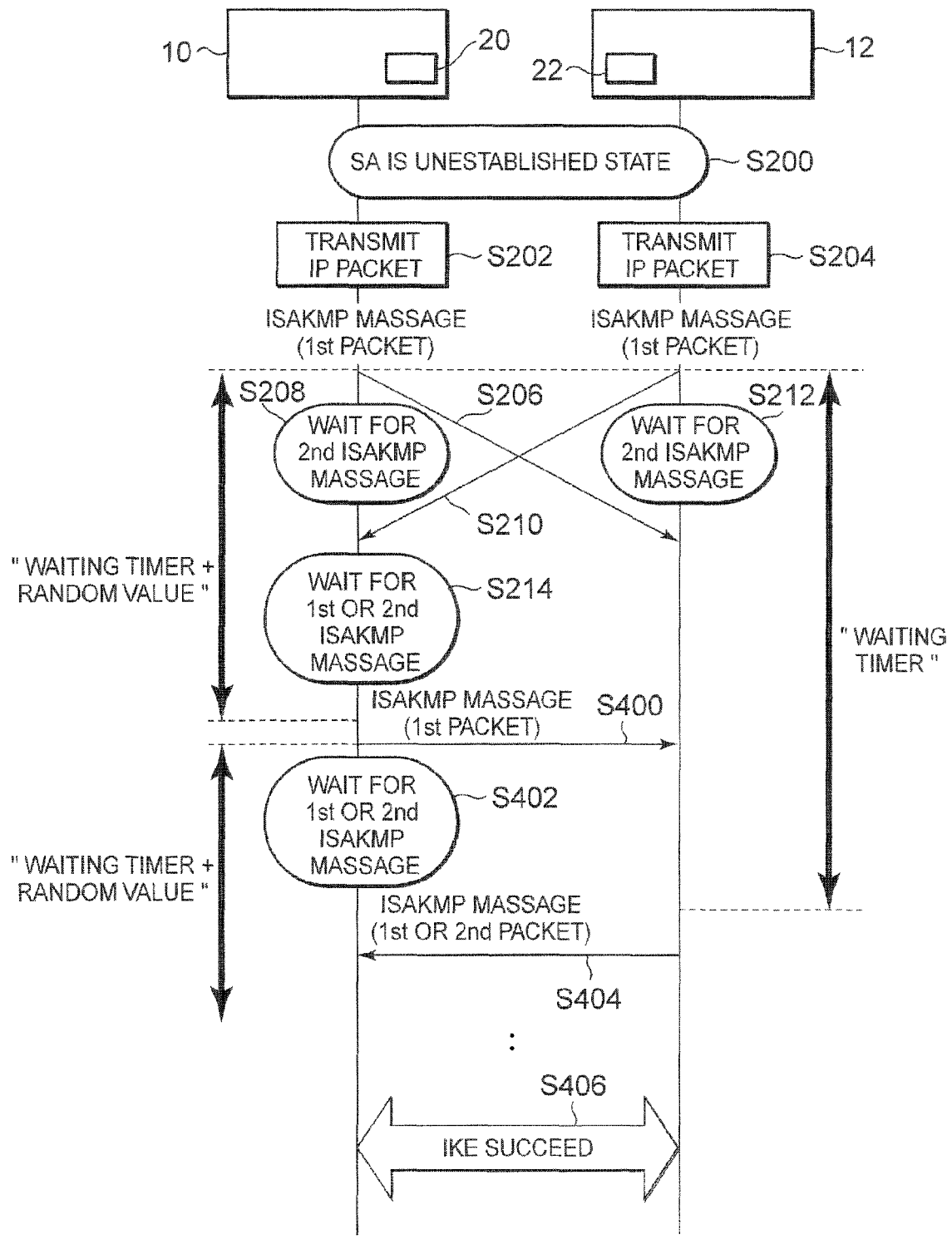
FIG. 4 is a diagram showing a third operation example of the communication devices.

Since the third operation may be based on operations similar to those of Steps S200 through Step S214 shown in FIG. 3, the third operation is shown using the same reference numerals in FIG. 4. When the waiting timer 20 of the communication device 10 is timed out prior to the opposite communication device 12 where the communication device 10 is in a state of waiting for a first or second ISAKMP message as shown in FIG. 4 (Step S214), the communication device 10 retransmits an ISAKMP message corresponding to a first packet to the transmitting device 12 while remaining in a state of being operated as an initiator (Step S400). Further, the time counting of the waiting timer 20 is resumed. In this case, the communication device 10 maintains the state of being operated as the initiator and remains in the state of waiting for the first or second ISAKMP message, and no state is changed (Step S402).

Next, when the third operation proceeds to Step S404 and the opposite communication device 12 transmits an ISAKMP message corresponding to a first packet, the communication device 10 performs an operation similar to the first operation. When the communication device 12 transmits an ISAKMP message corresponding to a second packet, the communication device 10 performs an operation similar to the second operation, thereby making it possible to cause the IKE to succeed (Step S406).

As described above, even though the message other than the message indicative of the expectation that the packet is transmitted is received from the opposite communication device where both communication devices 10 and 12 are operated as the initiators with the same timing and the first ISAKMP messages mismatch on the communication channel, at least one communication device is caused to have the state of being able to answer such a message, thereby making it possible to transmit the message that the opposite communication device expects, allow the IKE to succeed and establish the SA regardless of the method of implementing coping with the case where the packet has mismatched between the communication devices opposite to each other.

In particular, the procedure of causing the packet waiting timer of the self-communication device to have random values at random intervals when placed in the state of waiting for the packet from the opposite communication device, and causing even the packet other than the sequence of each packet expected to be transmitted from the opposite communication device to have a state of being receivable by the self-communication device is implemented, thereby making it possible to cause an exchange of packets to succeed finally even when packet crossing or mismatch has occurred.

Another embodiment of a communication system to which the present invention is applied will next be explained. The communication system according to the present embodiment compares values different from opposite devices like MAC addresses and IP addresses or the like of opposite communication devices 10 and 12 respectively when a packet mismatch has occurred, and determines whether the corresponding communication device should remain unchanged at an initiator or should be changed to a responder to operate as the responder.

The present embodiment will explain an operation example in which the MAC address (or IP address) of the communication device 10 is larger than the MAC address (or IP address) of the communication device 12.

Figure 5:
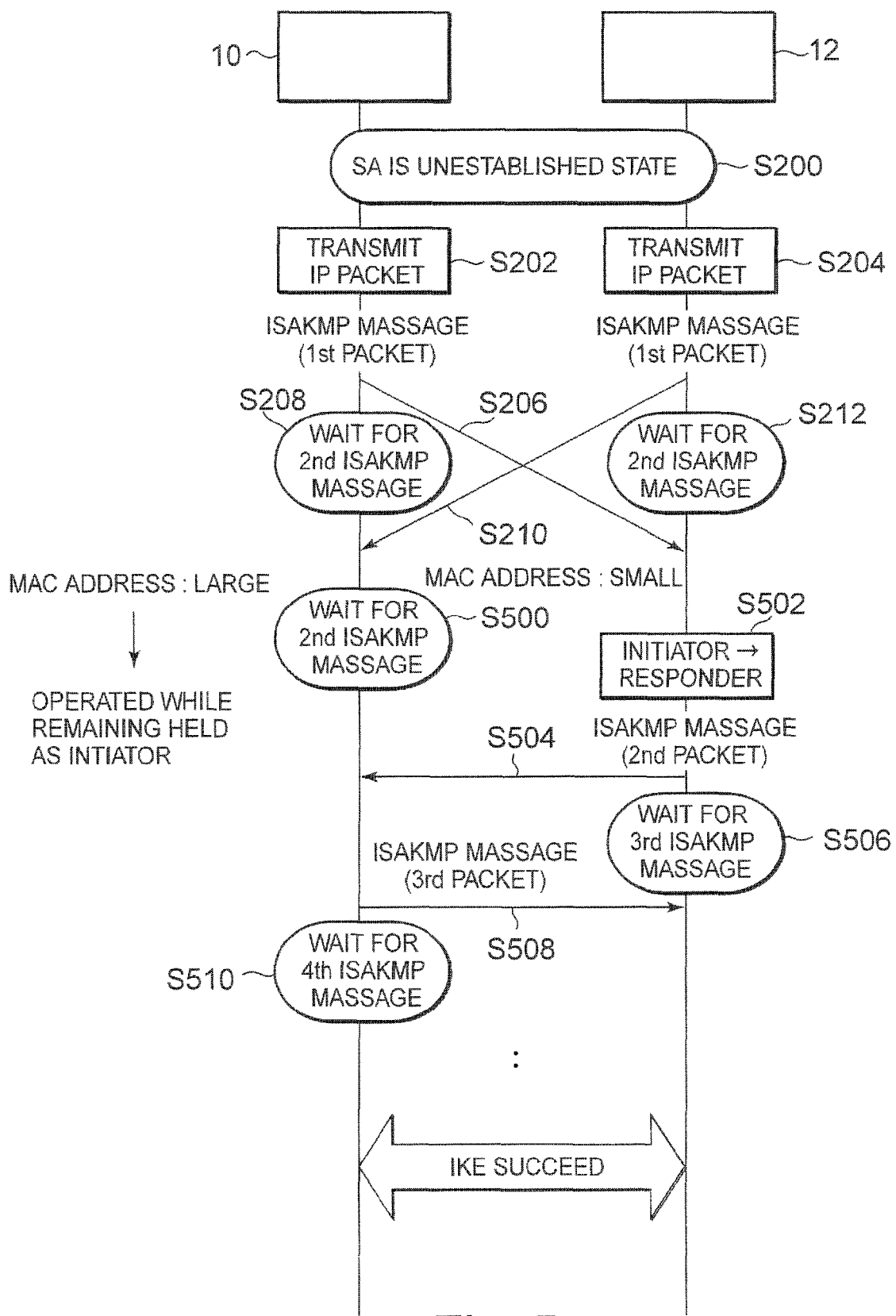
FIG. 5 is a diagram illustrating another operation example of communication devices.

As shown in FIG. 5, the operations of Steps S200 to S212 may be the same operations as those denoted at the same reference numerals shown in FIG. 2. When the communication devices 10 and 12 at Steps S208 and S212 respectively receive first ISAKMP messages from their opposite communication devices where they respectively transmit the ISAKMP messages each corresponding to a first packet and are respectively placed in a state of waiting for second ISAKMP messages as the initiators, the communication devices 10 and 12 respectively compare the magnitudes or the like of the MAC addresses or IP addresses of the opposite communication devices.

The communication device 10 having a value larger than that of its opposite device waits for a second ISAKMP message while remaining held as the initiator (Step S500). On the other hand, the communication device 12 having a value smaller than that of its opposite device is changed to a responder and transmits an ISAKMP message corresponding to a second packet to the communication device 10 (Step S504). Next, the communication device 12 is transitioned to a state of waiting for a third ISAKMP message (Step S506).

Next, the communication device 10 transmits the ISAKMP message corresponding to the third packet to the communication device 12 (Step S508) and is transitioned to a state of waiting for an ISAKMP message corresponding to a fourth packet (Step S510).

Thus, the mismatch of the ISAKMP messages corresponding to the first packet is resolved and the IKE can hence succeed.

When both of the communication devices 10 and 12 are operated as the initiators with the same timing and the ISAKMP messages each corresponding to the first packet have mismatched therebetween, the magnitudes of values inherent in the devices like the MAC address and IP address or the like of the self-device are compared if the opposite communication devices are of devices each of which makes an implementation for performing the same operation as coping with the case where the mismatch has occurred, whereby the device brought to the initiator can be decided immediately after the occurrence of the mismatch, thus making it possible to cause the IKE to succeed and establish the SA.

The magnitudes of the different values that cannot be identical to one another, such as the MAC address, IP address and the like have been compared between the opposite communication device and the self-communication device in this way. Thus, when the packet other than the sequence of each packet expected to be transmitted from the opposite device is received, the procedure of determining upon start of a packet exchange whether the corresponding packet should be accepted is implemented. As a result, the exchange of packets can be made successful even when a packet mismatch has occurred.

Although the above embodiment has explained the example in which the communication device large in MAC address or IP address is changed to the responder and the communication device small in MAC address or IP address remains held as the initiator, the present invention is not limited to it. The rule may be taken, that the communication device large in MAC address or IP address is changed to the responder and the communication device small in MAC address or IP address remains held as the initiator. Thus, the method of implementing the same rule between both communication devices 10 and 12 may be taken.

A further embodiment of a communication system to which the present invention is applied will next be explained. The communication system according to the present embodiment is formed in such a manner that when a packet mismatch has occurred, a bidirectional IKE is implemented and values different from those of an opposite device, such as a MAC address, an IP address and the like of an opposite communication device are compared in the course of the exchange of IKE's packets or upon its completion thereby to determine the magnitudes of the values, and a decision is made as to whether such an IKE that either one of the communication devices is set as an initiator (or responder) according to the result of determination should be made effective as an IPsec communication channel.

Figure 6:
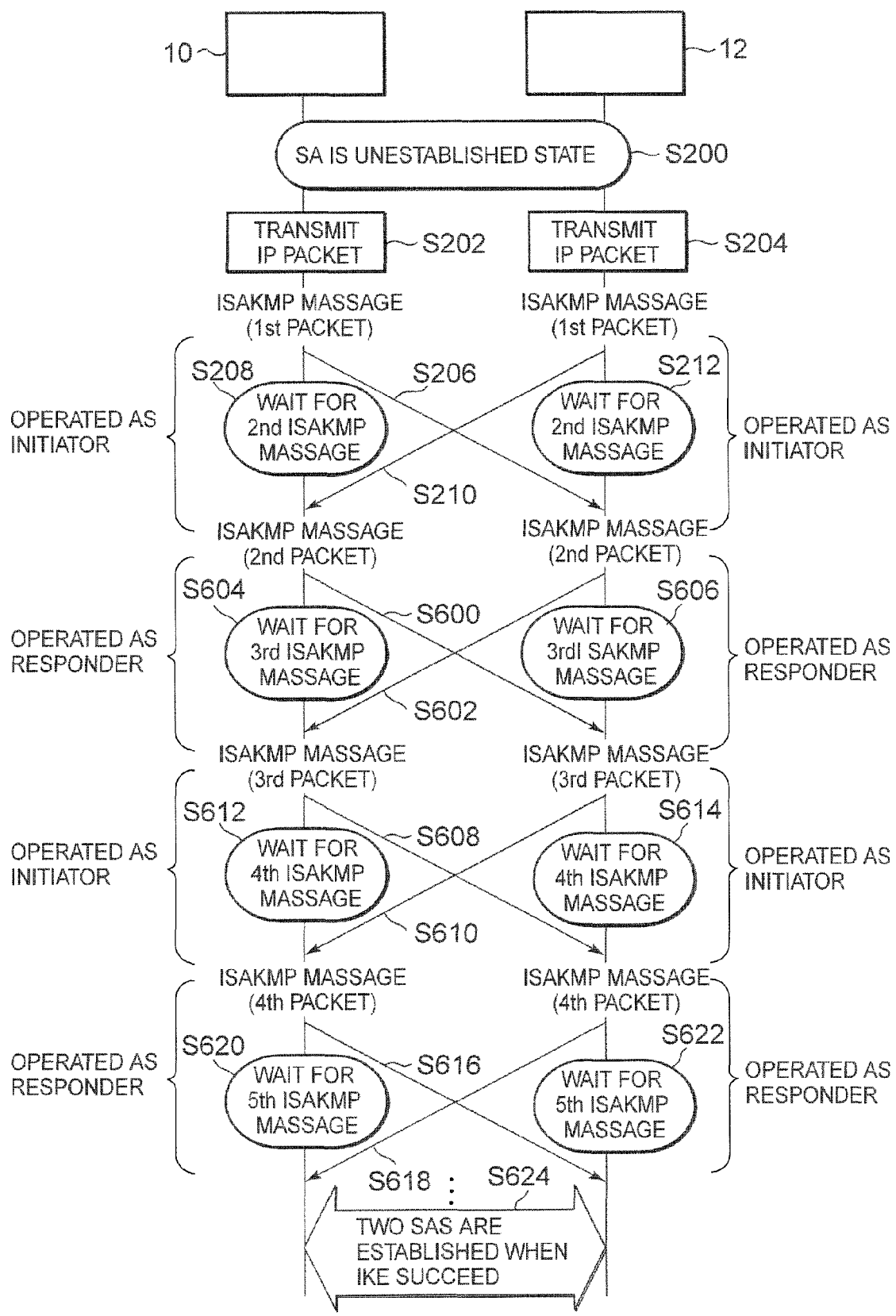
FIG. 6 is a diagram showing a further operation example of the communication devices.

As shown in FIG. 6, the operations of Steps S200 to S212 may be the same operations as those indicated by like reference numerals shown in FIG. 2. Communication devices 10 and 12 at Steps S208 and S212 respectively transmit ISAKMP messages each corresponding to a first packet. Thereafter, the communication devices 10 and 12 are respectively transitioned to a state of waiting for a second ISAKMP message. At this time, the communication devices 10 and 12 are both operated as the initiators.

The transmitting devices 10 and 12 each having received the ISAKMP message corresponding to the first packet respectively start operating as the responders. The communication devices 10 and 12 respectively transmit ISAKMP messages each corresponding to a second packet (Steps S600 and S602), and the communication devices 10 and 12 are respectively transitioned to a state of waiting for a third ISAKMP message (Steps S604 and S606).

The transmitting devices 10 and 12 each having received the ISAKMP message corresponding to the second packet start operating as the initiators respectively. The communication devices 10 and 12 respectively transmit ISAKMP messages each corresponding to a third packet (Steps S608 and S610), and the communication devices 10 and 12 are respectively transitioned to a state of waiting for a fourth ISAKMP message (Steps S612 and S614).

Next, the transmitting devices 10 and 12 each having received the ISAKMP message corresponding to the third packet start operating as the responders respectively. The communication devices 10 and 12 respectively transmit ISAKMP messages each corresponding to a fourth packet (Steps S616 and S618), and the communication devices 10 and 12 are respectively transitioned to a state of waiting for an ISAKMP message corresponding to a fifth packet (Steps S620 and S622).

Thus, when the first ISAKMP messages have mismatched between both communication devise 10 and 12, a bidirectional IKE is executed. Two SAs are established in the course of the exchange of the bidirectional IKE or after the bidirectional IKE has succeeded (Step S624). Then, it is determined whether SA with either one of the devices established as the initiator or the responder should be used in IPsec communication. Upon this determination, it can be judged using different values that cannot be values identical to one another with respect to the opposite device, such as the MAC address, IP address and the like of the opposite communication device.

In the example illustrated in the figure, for example, the MAC addresses of the opposed communication devices are compared with each other, and the SA established by the IKE at which the communication device 10 large in MAC address is operated as the initiator is made effective. The SA can be used in IPsec communication.

Thus, when both communication devices are operated as the initiators with the same timing, and the first ISAKMP messages have mismatched therebetween, the magnitudes of inherent values attached to the devices like the MAC address and the like are compared where the opposite communication device is of a device which performs the same implementation as the self-communication device as coping with the case where the mismatch has occurred, whereby it is determined in advance whether the IKE with either of the communication devices being set as the initiator should be made effective. It is possible to determine whether either of the two SAs should be selected and used after the completion of the bidirectional IKE.

The magnitudes of the different values like the MAC address, IP address and the like have been compared between the self-communication device and the opposite communication device in this way. Thus, when the packet other than the sequence of each packet expected to be transmitted from the opposite device is received by the self-device, the procedure of determining during the exchange of each packet or after the completion of the packet exchange whether the corresponding packet should be accepted is implemented. As a result, the exchange of packets can be made successful finally even when a packet mismatch has occurred.

Although each of the embodiments described above has explained the method for establishing, using the IKE, the communication channel used in the IPsec communication at which each IP packet is encrypted and communicated, the present invention is not limited to these. The present invention can be applied to all devices that generate communication channels in accordance with a procedure such as negotiations of a communication device that performs a cipher communication with an opposite device, for example.

While the preferred forms of the present invention have been described, it is to be understood that modifications will be apparent to those skilled in the art without departing from the spirit of the invention. The scope of the invention is to be determined solely by the following claims.

DRAWINGS

FIG. 1
Configuration Example of Communication System According to the Invention
   10 . . . COMMUNICATION DEVICE
   SA IS UNESTABLISHED STATE
   TRANSMIT IP PACKET
   ISAKMP MESSAGE (FIRST PACKET)
WAITING TIMER+RANDOM VALUE
   WAIT FOR SECOND ISAKMP MESSAGE
   WAIT FOR FIRST OR SECOND ISAKMP MESSAGE
   12 . . . COMMUNICATION DEVICE
   TRANSMIT IP PACKET
   ISAKMP MESSAGE (FIRST PACKET)
Waiting Timer
   WAIT FOR SECOND ISAKMP MESSAGE
   WAIT FOR SECOND ISAKMP MESSAGE
   ISAKMP MESSAGE (FIRST PACKET)
   WAIT FOR SECOND ISAKMP MESSAGE
FIG. 2
   First Operation of Communication Device
   S200 . . . SA IS UNESTABLISHED STATE
   S202 . . . TRANSMIT IP PACKET
   ISAKMP MESSAGE (FIRST PACKET)
WAITING TIMER+RANDOM VALUE
   S208 . . . WAIT FOR SECOND ISAKMP MESSAGE
   S214 . . . WAIT FOR FIRST OR SECOND ISAKMP MESSAGE
   S218 . . . INITIATOR→RESPONDER
   S220 . . . ISAKMP MESSAGE (SECOND PACKET)
   S222 . . . WAIT FOR THIRD ISAKMP MESSAGE
   S226 . . . IKE SUCCEEDS
   S204 . . . TRANSMIT IP PACKET
   ISAKMP MESSAGE (FIRST PACKET)
Waiting Timer
   S212 . . . WAIT FOR SECOND ISAKMP MESSAGE WAIT FOR SECOND ISAKMP MESSAGE
S216 . . . ISAKMP MESSAGE (FIRST PACKET)
 WAIT FOR SECOND ISAKMP MESSAGE
S224 . . . ISAKMP MESSAGE (THIRD PACKET)
 WAIT FOR FOURTH ISAKMP MESSAGE
FIG. 3
 Second Operation of Communication Device
S200 . . . SA IS UNESTABLISHED STATE
S202 . . . TRANSMIT IP PACKET
 ISAKMP MESSAGE (FIRST PACKET)
WAITING TIMER+RANDOM VALUE
S208 . . . WAIT FOR SECOND ISAKMP MESSAGE
S214 . . . WAIT FOR FIRST OR SECOND ISAKMP MESSAGE
S306 . . . ISAKMP MESSAGE (THIRD PACKET)
S308 . . . WAIT FOR FOURTH ISAKMP MESSAGE
S310 . . . IKE SUCCEEDS
S204 . . . TRANSMIT IP PACKET
 ISAKMP MESSAGE (FIRST PACKET)
Waiting Timer
 WAIT FOR SECOND ISAKMP MESSAGE
S300 . . . INITIATOR→RESPONDER
S302 . . . ISAKMP MESSAGE (SECOND PACKET)
S304 . . . WAIT FOR THIRD ISAKMP MESSAGE
FIG. 4
 Third Operation of Communication Device
S200 . . . SA IS UNESTABLISHED STATE
S202 . . . TRANSMIT IP PACKET
 ISAKMP MESSAGE (FIRST PACKET)
WAITING TIMER−RANDOM VALUE
S208 . . . WAIT FOR SECOND ISAKMP MESSAGE
S214 . . . WAIT FOR FIRST OR SECOND ISAKMP MESSAGE
S400 . . . ISAKMP MESSAGE (FIRST PACKET)
WAITING TIMER−RANDOM VALUE
S402 . . . WAIT FOR FIRST OR SECOND ISAKMP MESSAGE
S404 . . . ISAKMP MESSAGE (FIRST OR SECOND PACKET)
S406 . . . IKE SUCCEEDS
S204 . . . TRANSMIT IP PACKET
 ISAKMP MESSAGE (FIRST PACKET)
Waiting Timer
S212 . . . WAIT FOR SECOND ISAKMP MESSAGE
FIG. 5
 Another Operation Example of Communication Device
S200 . . . SA IS UNESTABLISHED STATE
S202 . . . TRANSMIT IP PACKET
S206 . . . ISAKMP MESSAGE (FIRST PACKET)
S208 . . . WAIT FOR SECOND ISAKMP MESSAGE
MAC ADDRESS: LARGE→OPERATED WHILE REMAINING HELD AS INITIATOR
S500 . . . WAIT FOR SECOND ISAKMP MESSAGE
S508 . . . ISAKMP MESSAGE (THIRD PACKET)
S510 . . . WAIT FOR FOURTH ISAKMP MESSAGE
 IKE SUCCEEDS
S204 . . . TRANSMIT IP PACKET
S210 . . . ISAKMP MESSAGE (FIRST PACKET)
S212 . . . WAIT FOR SECOND ISAKMP MESSAGE
MAC ADDRESS: SMALL
S502 . . . INITIATOR→RESPONDER
S504 . . . ISAKMP MESSAGE (SECOND PACKET)
S506 . . . WAIT FOR THIRD ISAKMP MESSAGE
FIG. 6
 Further Operation of Communication Device
S200 . . . SA IS UNESTABLISHED STATE
S202 . . . TRANSMIT IP PACKET
S206 . . . ISAKMP MESSAGE (FIRST PACKET)
Operated as Initiator
S208 . . . WAIT FOR SECOND ISAKMP MESSAGE
S600 . . . ISAKMP MESSAGE (SECOND PACKET)
Operated as Responder
S604 . . . WAIT FOR THIRD ISAKMP MESSAGE
S608 . . . ISAKMP MESSAGE (THIRD PACKET)
Operated as Initiator
S612 . . . WAIT FOR FOURTH ISAKMP MESSAGE
S616 . . . ISAKMP MESSAGE (FOURTH PACKET)
Operated as Responder
S620 . . . WAIT FOR FIFTH ISAKMP MESSAGE
S624 . . . TWO SAs ARE ESTABLISHED WHEN IKE SUCCEEDS
S204 . . . TRANSMIT IP PACKET
S210 . . . ISAKMP MESSAGE (FIRST PACKET)
Operated as Initiator
S212 . . . WAIT FOR SECOND ISAKMP MESSAGE
S602 . . . ISAKMP MESSAGE (SECOND PACKET)
Operated as Responder
S606 . . . WAIT FOR THIRD ISAKMP MESSAGE
S610 . . . ISAKMP MESSAGE (THIRD PACKET)
Operated as Initiator
S614 . . . WAIT FOR FOURTH ISAKMP MESSAGE
S618 . . . ISAKMP MESSAGE (FOURTH PACKET)
Operated as Responder
S622 . . . WAIT FOR FIFTH ISAKMP MESSAGE

What is claimed is:

1. A communication channel establishment method for establishing a communication channel between a first communication device and a second communication device opposite thereto, comprising the steps of:

waiting for a packet transmitted from the second communication device to the first communication device;

providing packet waiting timers each counting a time taken to wait for the packet, with a random interval left therebetween;

receiving a packet other than the sequence of each packet expected to be transmitted from the second communication device;

accepting the packet; and establishing the corresponding communication channel, based on the packet accepted in the accepting step;

wherein the first communication device functioning as a responder, when the first communication device transmits a first internet security association and key management protocol (ISAKMP) message to the second communication device and then receives the first internet security association and key management protocol (ISAKMP) message from the second communication device; and wherein the second communication device functioning as a responder, when the first communication device transmits the first internet security association and key management protocol (ISAKMP) message to the second communication device and then receives a second internet security association and key management protocol (ISAKMP) message from the second communication device.

2. The communication channel establishment method according to claim 1, wherein even when a packet mismatch occurs between a first packet transmitted from the first communication device to the second communication device and a second packet transmitted from the second communication device to the first communication device in the waiting step, the first communication device waits for the second packet.

3. The communication channel establishment method according to claim 1, wherein the packet is of a packet for establishing the corresponding communication channel for performing a cipher communication.

4. A communication channel establishment method for establishing a communication channel between a first communication device and a second communication device opposite thereto, comprising the steps of:
   waiting for a packet transmitted from the second communication device to the first communication device;
   receiving a packet other than the sequence of each packet expected to be transmitted from the second communication device;
   comparing the magnitudes of values different from one another set to the first communication device and the second communication device;
   accepting the packet; and
   establishing the corresponding communication channel, based on the packet accepted in the accepting step,
   wherein when the first communication device receives the packet other than the sequence of each packet expected to be transmitted from the second communication device in the receiving step, the accepting step determines based on said result of comparison whether the packet is accepted;
   wherein the first communication device functioning as a responder, when the first communication device transmits a first internet security association and key management protocol (ISAKMP) message to the second communication device and then receives the first internet security association and key management protocol (ISAKMP) message from the second communication device; and
   wherein the second communication device functioning as a responder, when the first communication device transmits the first internet security association and key management protocol (ISAKMP) message to the second communication device and then receives a second internet security association and key management protocol (ISAKMP) message from the second communication device.

5. The communication channel establishment method according to claim 4, wherein the accepting step determines upon start of a packet exchange whether the packet is accepted.

6. The communication channel establishment method according to claim 4, wherein the accepting step determines during the packet exchange whether the packet is accepted.

7. The communication channel establishment method according to claim 4, wherein the accepting step determines after the completion of the packet exchange whether the packet is accepted.

8. A communication channel establishment system for establishing a communication channel between a first communication device and a second communication device opposite thereto, comprising:
   means for waiting for a packet transmitted from the second communication device to the first communication device;
   time counting means provided with packet waiting timers each counting a time taken to wait for the packet, with a random interval left therebetween;
   means for receiving a packet other than the sequence of each packet expected to be transmitted from the second communication device;
   means for accepting the packet; and
   means for establishing the corresponding communication channel, based on the packet accepted by the accepting means;
   wherein the first communication device is a responder, when the first communication device transmits a first internet security association and key management protocol (ISAKMP) message to the second communication device and then receives the first internet security association and key management protocol (ISAKMP) message from the second communication device; and
   wherein the second communication device is a responder, when the first communication device transmits the first internet security association and key management protocol (ISAKMP) message to the second communication device and then receives a second internet security association and key management protocol (ISAKMP) message from the second communication device.

9. The communication channel establishment system according to claim 8, wherein even when a packet mismatch occurs between a first packet transmitted from the first communication device to the second communication device and a second packet transmitted from the second communication device to the first communication device, the waiting means waits for the second packet through the first communication device.

10. The communication channel establishment system according to claim 8, wherein the packet is of a packet for establishing the corresponding communication channel for performing a cipher communication.

11. A communication channel establishment system for establishing a communication channel between a first communication device and a second communication device opposite thereto, comprising:
   means for waiting for a packet transmitted from the second communication device to the first communication device;
   means for receiving a packet other than the sequence of each packet expected to be transmitted from the second communication device;
   means for comparing the magnitudes of values different from one another set to the first communication device and the second communication device;
   means for accepting the packet; and
   means for establishing the corresponding communication channel, based on the packet accepted by the accepting means,
   wherein when the receiving means receives the packet other than the sequence of each packet expected to be transmitted from the second communication device, through the first communication device, the accepting means determines based on said result of comparison whether the packet is accepted;
   wherein the first communication device is a responder, when the first communication device transmits a first internet security association and key management protocol (ISAKMP) message to the second communication device and then receives the first internet security association and key management protocol (ISAKMP) message from the second communication device; and
   wherein the second communication device is a responder, when the first communication device transmits the first internet security association and key management protocol (ISAKMP) message to the second communication device and then receives a second internet security association and key management protocol (ISAKMP) message from the second communication device.

12. The communication channel establishment system according to claim 11, wherein the accepting means determines upon start of a packet exchange whether the packet is accepted.

13. The communication channel establishment system according to claim 11, wherein the accepting means determines during the packet exchange whether the packet is accepted.

14. The communication channel establishment system according to claim 11, wherein the accepting means determines after the completion of the packet exchange whether the packet is accepted.

* * * * *